United States Patent Office 3,021,192
Patented Feb. 13, 1962

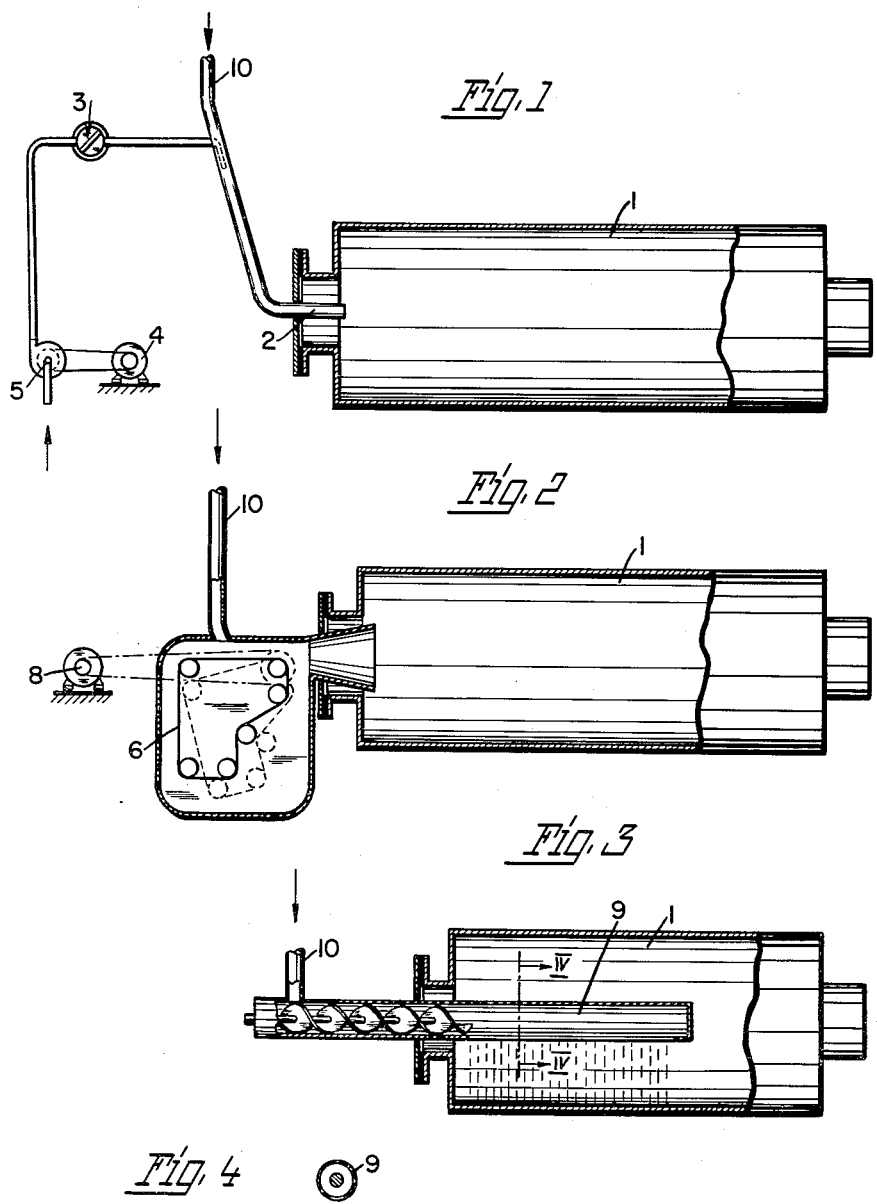

3,021,192
METHOD AND APPARATUS FOR THE CONTINUOUS PRODUCTION OF CALCIUM CYANAMIDE
Franz Kaess, Thomas Fischer, and Hermann Kronacher, Trostberg, Germany, assignors to Suddeutsche Kalkstickstoff-Werke A.G., Trostberg, Germany
Filed May 27, 1959, Ser. No. 816,089
Claims priority, application Germany May 28, 1958
11 Claims. (Cl. 23—78)

The invention relates to the continuous manufacture of calcium cyanamide in rotary kilns.

A great number of methods has been proposed for said purpose; almost all said methods attempt to overcome the difficulties which are due to the melting or sintering of the charge during the nitrogenation of the calcium carbide. The sintered charge cakes together to lumps and adheres to the wells of the furnace.

In most of the known procedures, the calcium carbide is charged into one end of the rotary kiln and discharged, after nitrogenation, from the other end of the kiln. According to one method, calcium carbide of any particular size, also powdered calcium carbide, is blown, together with conventional catalysts, by means of nitrogen from the discharge end of the kiln into the reaction zone. Hereby, the charge is fractionally distributed in the kiln in such a manner that the calcium carbide particles of smallest grain size are carried farthest, whereby the partially nitrogenated charge present in the reaction space acts as diluent. This method requires a certain definite ratio of the different particle sizes in the charge because it is otherwise impossible to obtain a homogeneous distribution of the charge in the kiln.

According to another method, the charge is separated into fractions of different particle sizes, which are then again mixed in the required proportions to produce fractions which are distributed over the reaction space in such a way that the largest particles of each fraction are nitrogenated within their residence time in the kiln.

The present invention solves the problem of controlling the kiln operation by adjusting the distribution of the charge over the length of the reaction space in a very simple and economic manner by the following steps:

(1) Only carbide of tube mill fineness (cement fineness) is used, that is material the major portion of which does not exceed a particle size of 0.15 mm. and has a fineness below 10,000 mesh/cm.²

(2) The temperature is adjusted by means of ground calcium cyanamide.

(3) The mixture of carbide powder and calcium cyanamide is homogeneously distributed over substantially the entire reaction zone. There are no zones of different grain size, or different calcium carbide content, or different temperatures, and therefore no zones of different rate of reaction.

(4) Heretofore, long rotary kilns were used for the calcium carbide nitrogenation, because they are particularly suitable for the nitrogenation of coarse grains of calcium carbide. We have found that for our process, the ratio—bed of the charge:surface of the kiln walls— is of importance. For best results, the length of the principal reaction zone, in which about 95 percent of the charged calcium carbide are converted to calcium cyanamide, must be short in relation to the diameter of the kiln, preferably in the ratio of 1–2:1.

The method represents the following advantages: Due to the fine homogeneous distribution of the charge over substantially the entire length of the reaction zone in a very thin layer and due to the use of finely ground material only, the reaction proceeds at such a fast rate that substantially no residual carbide can be found at any place of the kiln. As a result, the risk of caking and lump formation is eliminated.

The reaction space is considerably reduced over the space required by the known procedures. The relatively large amount of calcium chloride, required in the known continuous procedures as catalyst, can not only be considerably reduced but completely replaced by calcium fluoride.

Suitable apparatus for carrying out the invention is shown, by way of example, in the accompanying drawings where FIG. 1 is a diagrammatic view of a rotary kiln equipped with means for controlling the amount of gas used to introduce the calcium carbide;

FIG. 2 is a similar view of a kiln equipped with means to throw the calcium carbide over an adjustable distance into the kiln;

FIG. 3 is a view of a kiln similar to FIG. 2 equipped with a slotted tube for feeding the calcium carbide on the walls of the kiln, and FIG. 4 is a cross-section along line IV—IV of FIG. 3.

All the shown devices are designed to introduce the calcium carbide and nitrogen in the same direction into the kiln.

In the apparatus of FIG. 1, a nozzle 2 is arranged at one end of the rotary kiln 1; nitrogen and finely ground calcium carbide are blown together into the kiln. The amount of nitrogen passing through the nozzle 3 is continuously increased and decreased between maximum and minimum values by means of a rotary valve 3 controlling the nitrogen coming from the fan 5, which is driven by the motor 4. In this way, the calcium carbide powder is blown for steadily increasing and decreasing lengths into the kiln and thereby homogeneously distributed over the length of the rotary kiln 1. Said nitrogen may be part or the entire amount of the nitrogen used for the nitrogenation.

The oscillations of the nitrogen current may also be obtained by equipping the motor 4 with a device continuously changing its speed, or by continuously changing the angle of the axis of the injection nozzle with respect to the axis of the kiln.

In the embodiment of the invention illustrated in FIG. 2, the charge is fed over an endless conveyor belt 6 which throws the charge into the kiln. As shown by the dotted line, the inclination of the belt can be changed. The motor 8 driving the belt is equipped with continuous speed change means, for continuously and steadily increasing and decreasing the travel rate of the belt and thereby the force with which the charge is propelled into the kiln.

In the modification shown in FIG. 3, a longitudinally slotted channel or tube extends into the kiln 1. The charge is injected by means of a screw conveyor or blades which are driven with continuously increasing and decreasing speeds, and the slot is so dimensioned that the propelled charge falls homogeneously therethrough into the kiln and only a small amount is projected beyond the end of the tube.

The introduction of the nitrogen in parallel flow with the calcium carbide, and the heating of the kiln are carried out in any conventional manner, which is not part of the invention and therefore not shown in the diagrammatic drawings. The calcium carbide is introduced through the inlet pipe 10.

The propulsion force of the charge injecting means is so adjusted that the pulsating spray of the calcium carbide powder homogeneously covers a length of the kiln which is about 1.5 to 2 times the diameter thereof.

We claim:
1. A method for the continuous production of calcium cyanamide in a rotary kiln comprising continuously pro- pelling calcium carbide powder of substantially homogeneous particle size by a pulsating force into the kiln homogeneously over a substantially constant length thereof reacting said calcium carbide with nitrogen to calcium cyanamide, and continuously discharging said calcium cyanamide.

2. The method as defined in claim 1, wherein said pulsating force is adjusted to propel the calcium carbide powder over a length corresponding to about 1.5 to 2 times the diameter of the kiln.

3. A method for the continuous production of calcium cyanamide in a rotary kiln comprising continuously propelling calcium carbide powder of substantially homogeneous particle size by a nitrogen stream of pulsating force into the kiln homogeneously over a substantially constant length thereof, reacting said calcium carbide and nitrogen to calcium cyanamide, and continuously discharging said calcium cyanamide.

4. A method for the continuous production of calcium cyanamide in a rotary kiln comprising continuously propelling calcium carbide powder of substantially homogeneous particle size by a nitrogen stream into the kiln, continuously and evenly oscillating the angle of injection of said nitrogen-calcium carbide stream into the kiln so as to deposit the calcium carbide powder homogeneously in a reaction zone of substantially constant length, reacting the deposited calcium carbide with said nitrogen in said reaction zone to calcium cyanamide, and continuously discharging the calcium cyanamide.

5. An apparatus for the continuous nitrogenation of calcium carbide comprising a rotary kiln, a nozzle opening into said kiln, rotating conveying means in front of said nozzle, means for depositing powdered calcium carbide on said conveying means, the propelling angle of said conveying means into said nozzle changing continuously and uniformly between a substantially constant maximum and a substantially constant minimum angle, thereby changing continuously the distance to which the calcium carbide is propelled into said kiln so as to deposit said calcium carbide homogeneously over a length of the kiln defined by said maximum and minimum angles of injection.

6. The apparatus as defined in claim 5 wherein said conveying means is an endless conveyor belt.

7. An apparatus for the continuous nitrogenation of calcium carbide comprising a rotary kiln, a nozzle opening into said kiln, rotating conveying means in front of said nozzle, means for depositing powdered calcium carbide on said conveying means, the speed of rotation of said conveying means changing continuously and uniformly between a substantially constant maximum speed and a substantially constant minimum speed, thereby changing continuously the distance to which the calcium carbide is propelled into said kiln so as to deposit said calcium carbide homogeneously over a length of the kiln defined by said maximum and minimum angles of injection.

8. The apparatus as defined in claim 7 wherein said conveying means is an endless conveyor belt.

9. An apparatus for the continuous nitrogenation of calcium carbide comprising a rotary kiln, an inlet tube extending into said kiln, the part of said tube inside said kiln being longitudinally slotted at its lower side, rotatable conveying means in the unslotted part of said tube, means for feeding powdered calcium carbide to said conveying means, the speed of rotation of said conveying means changing continuously and uniformly between a substantially constant maximum speed and a substantially constant minimum speed, thereby changing continuously the distance to which the calcium carbide is propelled into said kiln so as to deposit said calcium carbide homogeneously over a length of the kiln defined by said maximum and minimum angles of injection.

10. The apparatus as defined in claim 9 wherein said conveying means is a screw conveyor.

11. An apparatus for the continuous nitrogenation of calcium carbide comprising a rotary kiln, an inlet tube to introduce powdered calcium carbide into said kiln, a gas conduit opening into said inlet tube, a valve in said gas conduit, and pumping means for feeding gas into said conduit, said valve changing rhythmically its position between a substantially constant maximum opening and a substantially constant minimum opening, thereby causing pulsations of the gas stream pumped into said inlet tube and thereby changing the force injecting said calcium carbide into the kiln.

References Cited in the file of this patent

UNITED STATES PATENTS

| | | |
|---|---|---|
| 1,082,419 | Gee | Dec. 23, 1913 |
| 1,243,186 | Kahout | Oct. 17, 1917 |
| 2,161,328 | Winter et al. | June 6, 1939 |
| 2,352,051 | Windlant et al. | June 20, 1944 |